United States Patent [19]

Hanson et al.

[11] 4,197,793
[45] Apr. 15, 1980

[54] TACO SHELL MANUFACTURING EQUIPMENT USING A LOW PRESSURE STEAM CHAMBER

[75] Inventors: Sheldon H. Hanson; Craig B. Thompson; James E. Olson, all of Stoughton, Wis.

[73] Assignee: Heublein, Inc., Hartford, Conn.

[21] Appl. No.: 822,737

[22] Filed: Aug. 8, 1977

[51] Int. Cl.² .......................................... A47J 37/12
[52] U.S. Cl. ...................................... 99/352; 99/404; 99/427; 99/443 C
[58] Field of Search ................. 99/352, 355, 371, 373, 99/386, 404, 423, 427, 443 C, 467, 426; 198/403, 502, 577

[56] References Cited

U.S. PATENT DOCUMENTS

| | | | |
|---|---|---|---|
| 1,579,517 | 4/1926 | Chapman | 99/371 X |
| 1,654,799 | 1/1928 | Forrest | 99/467 X |
| 2,948,619 | 8/1960 | Ashley | 99/352 X |
| 3,115,084 | 12/1963 | Anetsberger et al. | 99/352 |
| 3,146,730 | 9/1964 | White | 99/353 X |
| 3,272,311 | 9/1966 | Blakewell et al. | 198/817 X |
| 3,690,895 | 9/1969 | Amadon et al. | 99/404 X |
| 3,736,860 | 6/1973 | Vischer, Jr. | 99/443 C X |
| 3,763,764 | 10/1973 | Schy | 99/404 X |
| 3,785,273 | 1/1974 | Stickle | 99/404 |
| 3,935,807 | 2/1976 | Main et al. | 99/352 |
| 3,982,625 | 9/1976 | Wentz et al. | 198/577 X |
| 3,994,386 | 11/1976 | Toby | 198/422 X |
| 4,009,775 | 3/1977 | Wolfelsperger et al. | 99/423 X |

Primary Examiner—George F. Mautz
Assistant Examiner—Arthur O. Henderson
Attorney, Agent, or Firm—Watson, Leavenworth, Kelton & Taggart

[57] ABSTRACT

Taco shell manufacturing equipment that comprises in combination with suitable means to form and bake disk tortillas, certain means to equilibrate moisture throughout such baked tortillas in a relatively short tempering time of the general order of a few minutes as they are passed in successive longitudinally-spaced groups of substantially transversely aligned disks continuously through an elongated lateral steam chamber upon traveling lateral open web belting means as received from baking means and while being subjected in this chamber to relatively low pressure steam until discharged by this belting means through an exit end opening of the steam chamber as tempered tortillas. Driven lateral transfer means receive the tempered tortillas in the longitudinally-spaced transverse groups from the exit end of the steam chamber and transports them laterally forward to the entrance end of tortillas folding and frying apparatus. The equipment includes means for transporting the tortillas in lap-folded form through a hot fat bath in the frying apparatus, and means to deliver the fried tortillas as lap-folded taco shells from the frying apparatus to suitable packing means for ultimate marketing.

23 Claims, 5 Drawing Figures

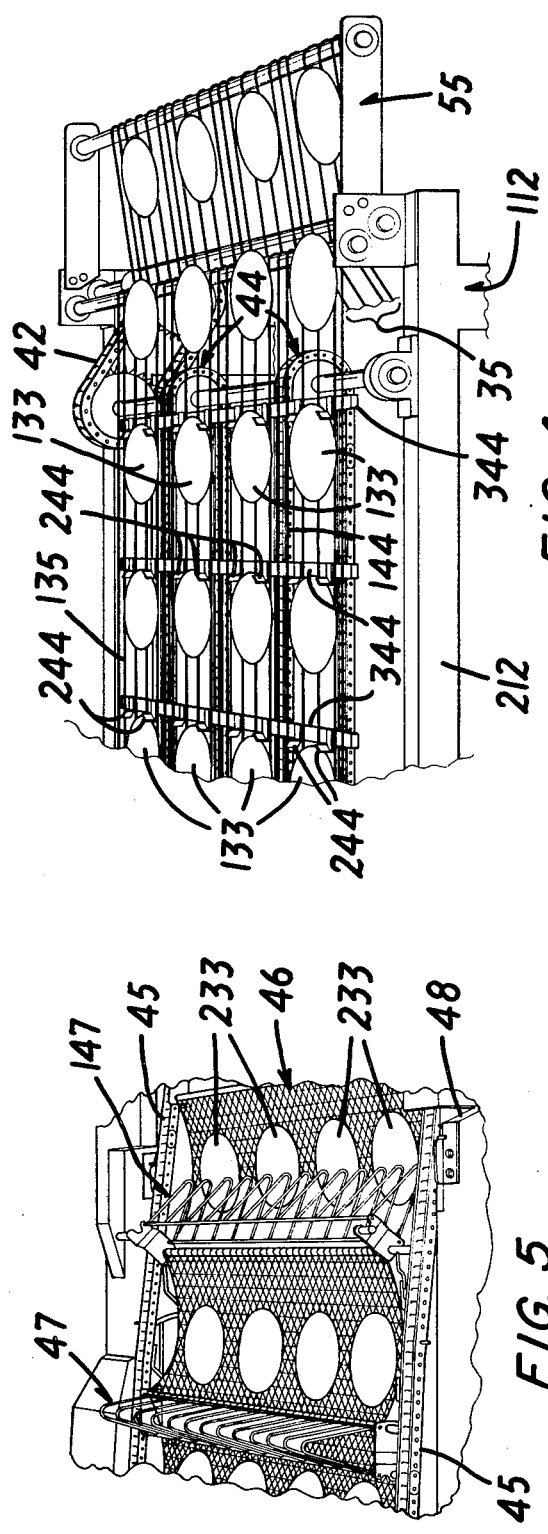
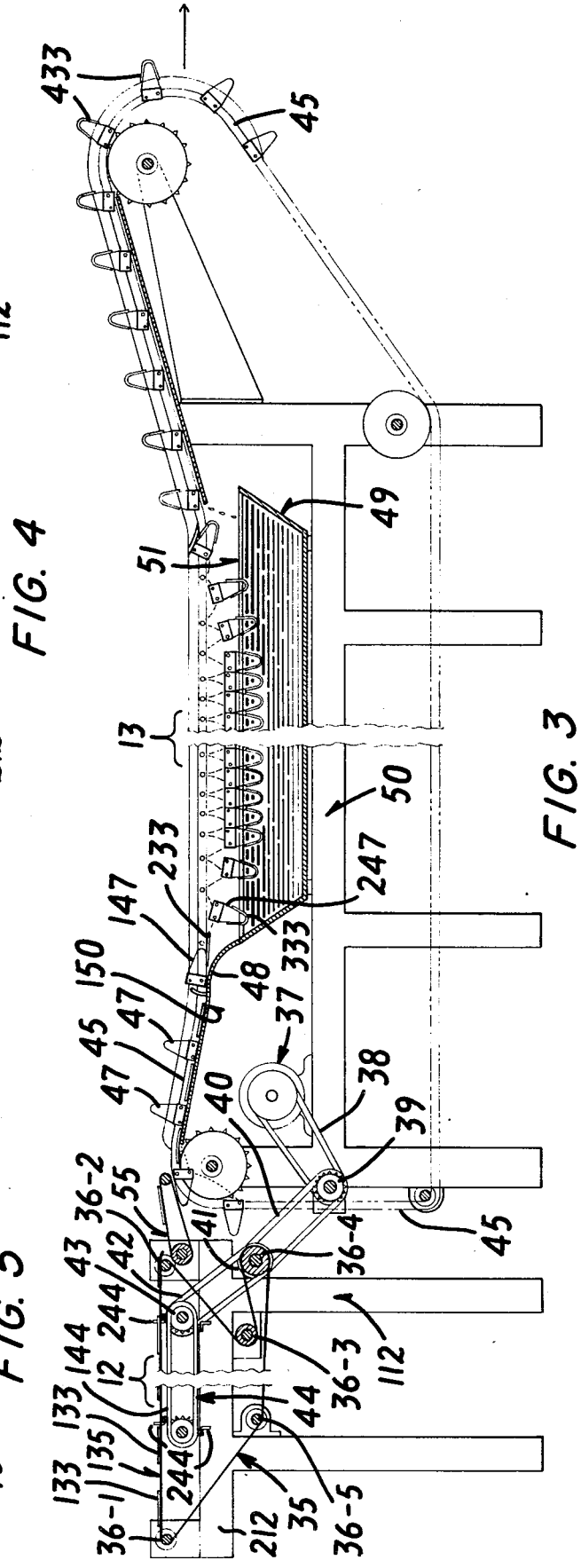

TACO SHELL MANUFACTURING EQUIPMENT USING A LOW PRESSURE STEAM CHAMBER

BACKGROUND AND SUMMARY

The present invention is concerned with taco shell manufacturing machine equipment which usually includes a step of ageing hot baked tortillas by first cooling in ambient air and then stacking for moisture, equilibrate at ambient temperature together undesirably demanding a period of time of about one to two hours, appreciable extra manual labor, undesirable occupation of considerable extra factory area and objectionable excessive handling.

Prior to the present invention the most sophisticated manufacturing equipment devised to supplement the usual preparation of making disk tortillas from masa dough, prepared from ground and cooked corn, included suitable baking oven structure and transport means to pass the tortillas through while baking, equipment to move the baked tortillas through the ambient atmosphere for cooling, stacking the cooled tortillas for an hour or more to effect moisture equilibriation, and then unstacking them and placing them on feed-in equipment successively to transport them through frying apparatus to fold them into tacos and fry them while being advanced through hot fat. The frying apparatus may be of the general type of that disclosed and claimed in the Stickle U.S. Pat. No. 3,785,273 of Jan. 15, 1974, which is limited to certain frying equipment without reference to any particular means for feeding tortillas thereto or receiving fried tacos therefrom. Since such a specific frying equipment, or variant thereof, is not claimed herein alone or as a critical unit of the certain assembly combination proposed in the present disclosure it has no pertinency to the subject matter defined in the present claims.

A general object of the present invention is to provide in succeeding and cooperative association a tortillas baking oven, a tempering steamer, a combined tortillas folder and deep fat fryer, and a timing transfer mechanism between the steamer and fryer, which in part are unique and reliably operative to produce with unusual rapidity and much fewer hand operations the production of fried tacos while eliminating much of the discard wastage heretofore accepted as inevitable.

A more specific object of the invention is to provide in such an assemblage a unique tortillas tempering mechanism which continuously processes therethrough baked tortillas while effectively tempering them in a relatively short time, such as of the order of a few seconds to a few minutes, without manual handling and delivers these effectively tempered tortillas in orderly and desirably continuous fashion to a deep fat fryer for automatic processing therethrough to produce successively desired taco shells.

Another object of the invention is to provide an easily performed and reliable process of making the fried taco shells by laterally passing in a period of a few minutes masa dough disk tortillas into and through an elongated steam tempering chamber which, at relatively low steam pressure, reliably tempers them during their relatively rapid transit therethrough to attain effectively a desired equilibrate of the moisture in these tortillas so that upon immediately following passage thereof through the folding and deep fat frying equipment fried tacos of excellent quality are reliably delivered.

The taco shell manufacturing equipment of the present invention successively receives from suitable means series of baked disk tortillas and delivers them to means to equilibrate moisture completely through them in a relatively short tempering time of the general order of about a few seconds to a few minutes. This is accomplished by passing them in longitudinally-spaced groups of substantially transversely aligned disks continuously and successively through an elongated lateral steam chamber upon traveling lateral open web belting means as received from the baking means and while being subjected in this chamber to relatively low pressure steam until discharged by the belting through an exit end opening of this chamber as tempered tortillas. Driven lateral transfer means receive the tempered tortillas in such longitudinally-spaced transverse groups from the exit end of the steam chamber and transports them laterally forward to the entrance end of tortillas folding and frying apparatus. There are provided means for transporting the tortillas in lap-folded form through a hot fat bath in the frying apparatus, and means delivering the fried tortillas as lap-folded taco shells from this frying apparatus to means for packing them for ultimate marketing. Such taco shell manufacturing equipment includes to advantage driving means for the frying apparatus transporting means and, in association therewith, means for adjusting during operation the relative speeds of such fryer driving means and driving means for a lateral transfer belting run which feeds the former whereby the tempered tortillas are delivered to the fryer transporting means in properly timed relation.

Such taco shell manufacturing equipment is characterized by lateral transfer means intervening the exit end of the steam tempering chamber and the entrance end of the tortillas folding and frying apparatus which comprises a lateral run of an open web transfer belting means and means driving this transfer belt-ing run at certain linear speed that assures delivery thereby of successive transversely-aligned groups of steam-tempered flat tortillas to folding means carried by the tortillas-transporting means of this frying apparatus in properly timed relation whereby the flat tortillas in each transversely-aligned group are lap-folded transversely against longitudinally-spaced, transversely-extending, ridge-shaped open web forms and substantially diametrically. Consequently, the lap-folded tortillas, are fried into U-shaped taco shells as they are transported through the hot bath of the fryer for delivery therefrom.

The preferred process of making fried taco shells in accordance with the present invention and which is advantageously performed by the preferred equipment taught herein, as well as by equivalent machine combinations within the scope of the present invention, includes passing spaced rows of disk tortillas through the steam chamber by equipment in the form of a top lateral run of an endless open web belting with relatively low pressure steam thoroughly contacting the top and bottom faces of the disk tortillas supported on this run; and submitting the traveling tortillas on this belting run to tempering action by relatively low pressure steam, which may be of the order of about 15 psi, during this passing time period which is preferably about ten seconds (10 sec.).

Other objects of the invention will in part be obvious and will in part appear from reference to the following detailed description taken in connection with the accompanying drawings, wherein like numerals identify similar parts throughout, and in which:

FIG. 3 is a side elevational view, with parts broken away, of a tortillas folder and deep fat fryer combination, and of a preceding tortillas transfer and monitoring mechanism intervening the discharge end of the steam chamber of FIG. 2 and the entrance end of the fryer;

FIG. 4 is an enlarged perspective detail, with parts broken away, of a top section of the tortillas transfer equipment and fryer feed-in mechanism of FIG. 3; and FIG. 5 is an enlarged perspective detail, with parts broken away, of a portion of the tortillas transport equipment of FIG. 3, illustrating certain action of folding a group of tortillas thereby.

Figure 1:
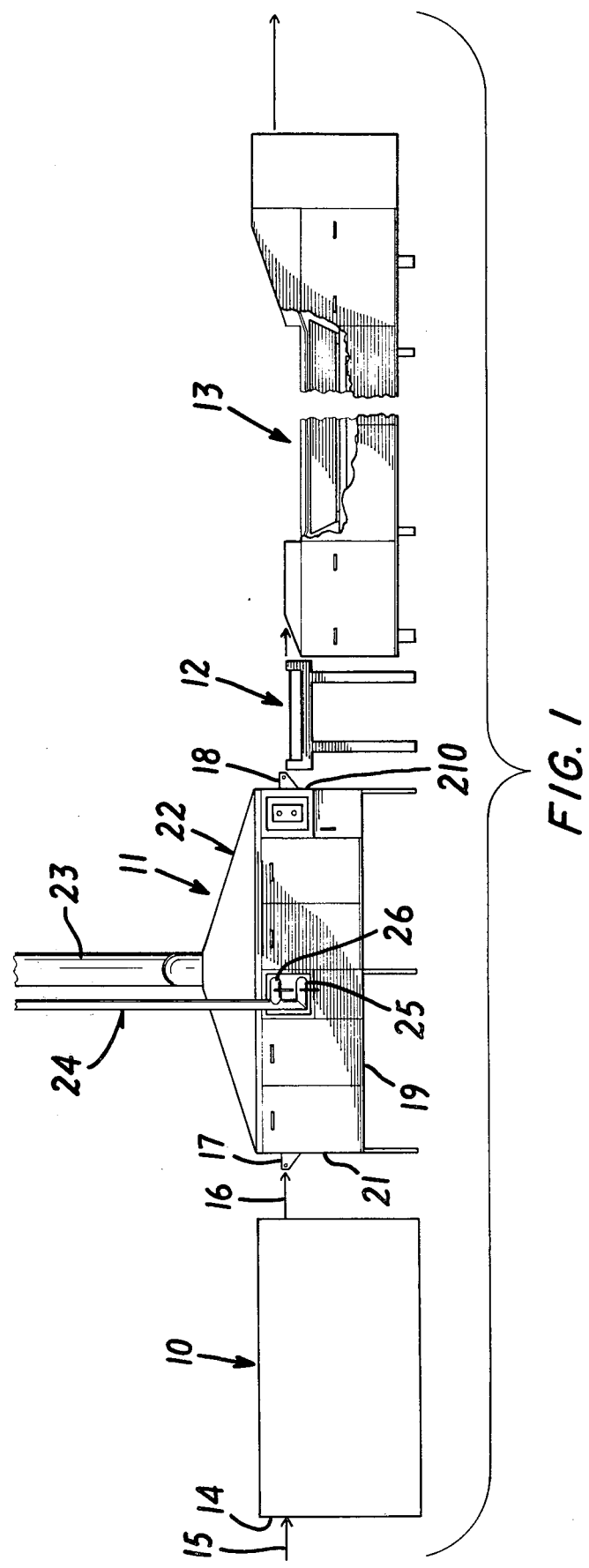
FIG. 1 is a side elevational view of an embodiment of the manufacturing equipment of the present invention, with parts being diagrammatically illustrated.

As will be seen in FIG. 1 an embodiment of the taco shell manufacturing equipment of the present invention may include in series and successive arrangement a suitable baking oven means diagrammatically indicated at 10, a lateral steam chamber 11, driven lateral transfer means 12 receiving tempered tortillas from the exit end of the lateral steam chamber 11 and transferring them forward, and a combined tortillas folding and frying apparatus 13 receiving those transferred tortillas. Preferably the baking oven means may be a single pass gas fired oven which may be equipped with supplemental infrared heating elements, and it is provided with a driven transport endless belt having a lateral top run extending from the entrance end 14 to provide a projecting loading feed-in portion 15 and also extending from the exit end to provide a delivery transfer section 16. Such endless belt preferably may be of the type of a driven lateral belting of open webbing, which may be formed from stainless steel mesh. The discharge end of the top run of the transport belt extending laterally through the baking oven 10 is suitably associated with an intake end, located at 17, of a similar transport belt extending through the lateral steam chamber 11 to a discharge end 18 at the opposite end of this steam chamber.

Figure 2:
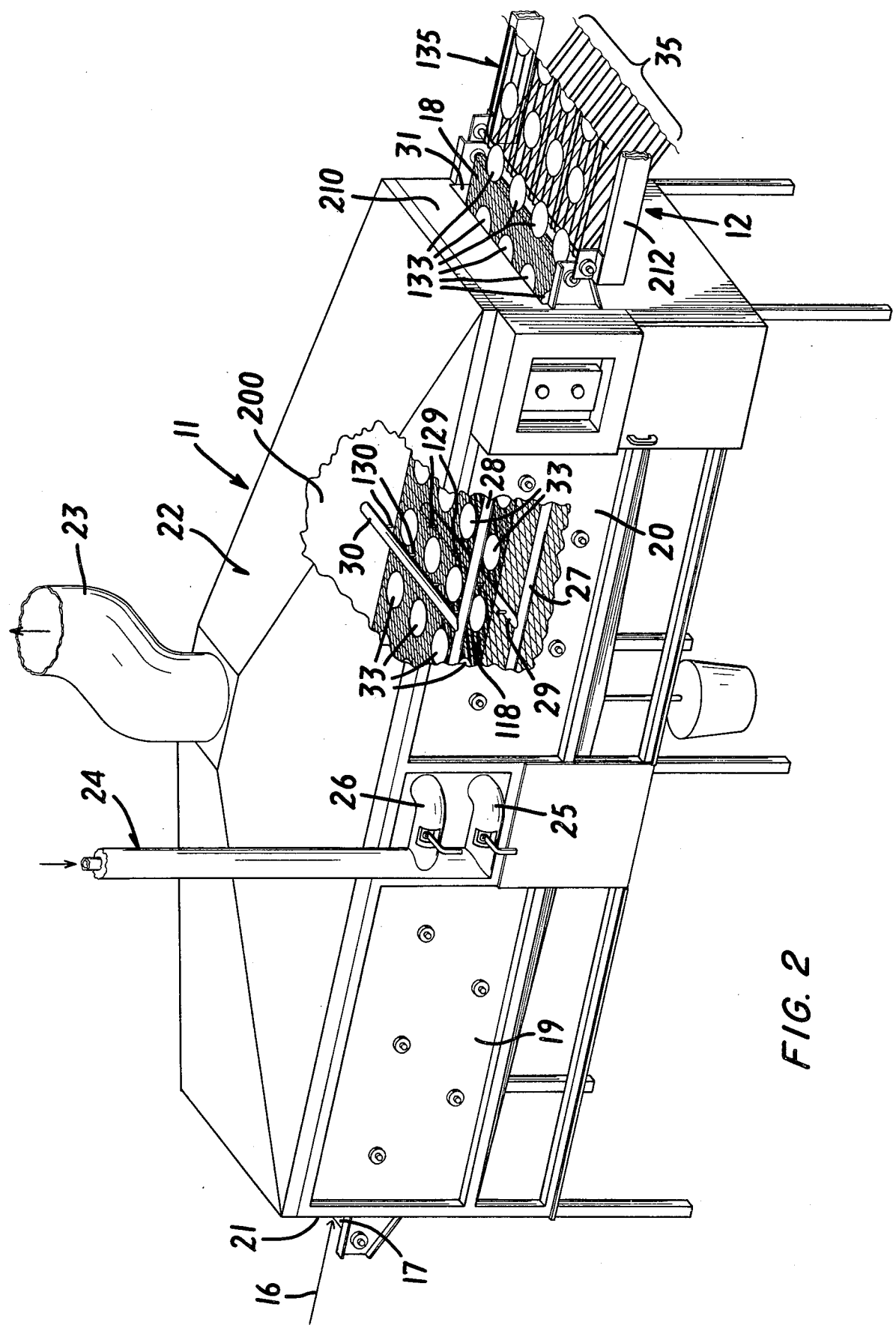
FIG. 2 is a perspective view, with parts broken away, of a steam chamber and tortilla disks transporting and transferring equipments thereof of the present invention which may be used to advantage in taco shell manufacturing equipment.

As will be understood more fully from FIG. 2 the lateral steam chamber 11 preferably may be defined by substantially closed wall structures at the bottom 19 and sides 20 and 200, chamber end walls 21 and 210 that are cooperatively connected at opposite ends of the chamber to the bottom and sidewalls, and a vented hood 22 closing off the top of the chamber, with a hollow stack 23 providing a vent therefor. Steam supply pipe 24 is connected to branch supply elbows 25 and 26 which, as will be best understood from FIG. 2, are respectively connected to longitudinally-extending branch supply conduits 27 and 28 of similar construction. Two sets of transversely-extending outlet sections 29 and 30 are provided which are respectively fed low pressure steam by the longitudinally-extending supply conduits 27 and 28, with these transversely-extending outlet sections being supported by the latter, or any other suitable means, at longitudinally spaced points about one foot (1') apart. Spaced steam outlet openings are provided in the top sides of the transversely-extending outlet sections 29 and in the bottom sides of the transversely-extending outlet sections 30, preferably by nozzles that are carried thereby. Such nozzles for the lower transversely-extending outlet sections 29 are indicated at 129 and those for the transversely-extending outlet sections 30 are indicated at 130.

The exit end wall 210 is provided with a transverse slot 31 serving as an exit or discharge opening through which extends the delivery end 18 of the top run of the endless belt 118. The opposite inlet end 21 of the steam chamber is provided with a similar transverse inlet end opening (not shown since it may be of dimensions similar to those of exit or outlet end opening 31). The steam chamber defined by the structure illustrated at 11 may be about fifteen feet (15') long, and the top run of its lateral endless belt, a portion of which is seen at 118, travels between the sets of downwardly extending nozzles 130 and the sets of upwardly extending nozzles 129. This endless belt may be open web belting means, such as the belting of open steel mesh as is employed in the baking oven 10. The opposed lower groups 129 and upper groups 130 of steam supply nozzles are longitudinally spaced apart about six inches (6") so that there are approximately, by way of example, twenty lower transversely-extending steam outlet sections 29 and a like number of the upper transversely-extending outlet sections 30. Low pressure steam, which may be at about 15 psi, provides gentle steam jets exiting through the opposed sets of nozzles 129 and 130 thoroughly to inject such steam into and through each group of four disk tortillas illustrated in FIG. 2 at 33.

In the above-indicated manner the successive transverse groups of four disk tortillas that were arranged upon the endless feed-in open web belting of the baking oven 10 are delivered into the inlet end of the steam chamber or steamer 11 upon the top run of its endless open web belting with maintenance of the same pattern of the longitudinally-spaced transverse groups of disk tortillas, as is illustrated in FIG. 2, to submit them to the tempering or equilibrate moisture treatment of the steam at about 15 psi for a total tempering time of a few seconds to a few minutes, e.g., about 10 seconds, to complete in this time such thorough tempering as that which required one to two hours of cooling the baked disk tortillas and then stacking them to attain acceptable moisture equilibriation as was previously practiced. The attainment of such equilibrate of the moisture as obtained by such treatment in the lateral steam chamber 22 during such short tempering time produces at the exit opening 31 delivery of completely tempered disk tortillas 133, then to produce thereby successively such groups of four tempered tortillas for transfer to the open web belting means 35 of suitable lateral transfer means provided by transfer unit 12 and its forwardly traveling top run 135, which may be a plurality of longitudinally extending, transversely-spaced, endless ropes or strands of tubular rubber, plastic, etc.

As will be seen from FIGS. 2 and 3 the transfer means 12, intervening the outlet 31 of the steam chamber 11 and the entrance end of the tortillas folding and frying apparatus 13 includes a supporting structure or bridge 112 on the lateral frame 212 of which are carried or rotatably supported suitable rope belting rollers 36-1, 36-2, 36-3, 36-4, and 36-5 about which are draped the endless rope web belting 35 to provide the lateral forwardly-traveling transfer delivery run 135. A suitably supported electric motor 37, which may be a DC motor having a very fine speed adjusting control rheostat which when manipulated a small degree will change slightly the speed thereof, may drive by belting or a chain drive 38 a pulley or spur gear 39 (which is suitably supported with this motor upon fryer frame 50) for in turn driving by suitable belting or endless chain 40. The endless belting or chain 40 in turn drives a pulley or spur gear 41 for the following drive of endless belt 42 which is adapted to drive by spur gear or pulley 43 an endless timing belt 44 as a terminal drive thereof. The top run 144 of endless timing belt 44 travels laterally forward just below the forwardly traveling top run 135 of the transport belt 35 and by the suitable intervening belting or endless chains it may be caused to have linear transport as dictated by the spur gear or pulley at 39.

The drive at 39 preferably includes one or more spur gears which has or have a pitch circle of an effective driving diameter about equal to the effective driving diameter of the pulley or gear which drives the endless belt or chain 40 to drive the timing belt 44 at a certain speed. This spur gear at 39 or the pair thereof is or are meshed with one or a pair of endless chains 45 which are lapped about suitable gears of the tortillas folder and deep fat fryer 13 to carry therewith an endless open flexible web of stainless steel mesh 46 (FIG. 5) and longitudinally-spaced, transversely extending, ridge-shaped, open web folding forms 47. Thus this flexible web 46 and the longitudinally-spaced folding forms 47 are driven at substantially the same linear speed as that of the top run 144 of the timing belt 44. The entrance end section 150 of the fryer 13 preferably is sloped downwardly toward the entrance lip 48 of the deep fat fryer pan 49, and it is essential that the next oncoming, transversely-spaced group of tortilla disks be so fed to this sloped entrance section in properly timed relation with and between a pair of the successive ridge-shaped folding forms as to cause the immediately following one of this pair (147) when rocked forward toward the disk tortillas just prior to immersion in the hot fat bath 51 to place its ridge crest approximately along the transverse medial diameters of the tortilla disks (233 in FIG. 5). Thus, as each successive ridge-shaped open web form is rocked forward at 147 for proper lapping of the transverse row of tortillas at 233 it will lay over about a one-half sector of each of the latter and then, in further rocking forward to an inverted position, such as at 247 in FIG. 3, it will fold these tortillas down into a transverse lapping trough of the flexible web 46 so that these U-shaped tortillas 333 are held clamped in such open doubled shape for frying into taco shells 433 during immersive transport through the hot fat bath 51, for ultimate removal and delivery.

It is thus critically important that the delivery of the successive groups of transversely spaced, tempered tortillas be delivered by the top run 135 of the endless transfer belt 35, and an intervening delivery bridge 55 (FIGS. 3 and 4) that is driven in pace with the fryer transport chains 45, be carefully timed so that the delivered tortillas will be placed on the tortillas flexible folding and fryer transporting mesh web 46 in positions that will assure such substantially equal semicircular sectors on both sides of the transverse diametrical fold lines. This may be accomplished by equipping the timing belt 44 with transversely-spaced, upstanding dogs 244 which, on the top run 144 thereof, will project upwardly from longitudinally-spaced, transverse carrying strips 344 mounted in endless timing belting means 44, and preferably carried by the laterally spaced endless belting chains thereof (FIG. 4) for visual observation of tortillas positions relative to the transverse spaces of such transfer belting in which the tortillas may be carried for delivery to the folder and fryer endless web 46 in positions assuring acceptable transverse tortilla foldings. Such observations of a control operator will guide his rheostatic control manipulations of the speed of the driving motor 37. However, various more fully automatic controls and monitoring mechanisms will readily occur to a skilled mechanic, e.g., a photocell optical sensing mechanism in which photocell means responsive to a light beam from a light source may be employed on opposite upper and bottom sides of the top delivery run 135 of the transfer belt 35 so that the excitation of such photocell means may be cut off by intervening tortillas as they pass between the photocell means and light sources, and control of switch means thereby temporarily to speed up or slow down the drive of transfer belting for proper timing of delivery of tortillas to the folding and frying apparatus transport equipment.

Since the open web transfer ropes belting 35 is to have its top run 135 traveling forward just slightly faster than the transport chain 45 of the fryer, the drive of this open web belting can be effected by the roller 36-4 about which the belting ropes are lapped of a diameter just slightly larger than the effective pitch circle of a gear in the drive between the fryer transport driving gear at 39 and that of the flight dogs driving gear at 43.

As a result, the successively spaced apart transverse rows of the tortilla disks which are discharged from the exit end of the steamer 11 upon the top run of the open web ropes belting, 135 will travel only very slightly faster than the upstanding dogs 244 which can be seen extending slightly thereabove at spaced intervals to indicate that with respect to the transverse disk tortillas 133 in a certain row located between such transverse rows of the dogs the infeed by this top run to the entrance end of the transport chain of the fryer is proper. If, however, the back sectorial margin of each of the tortillas 133 is riding up on or jammed against the immediately following transverse rows of upstanding dogs 244 the tortillas may be moved forward relative to the latter in following rows by momentary slowing down of the forward travel of the dogs. This can be accomplished by the rheostatic control of the DC motor 37. This slowing down is only a momentary retard of the rheostatic control of the DC motor accomplished by the operator "jogging" this rheostatic control. As a result, the transverse rows of the tortilla disks 133 as they are ejected from the steamer 11 will now be discharged onto the upper run 135 of this ropes transport belt in positions intervening the transverse rows of the upstanding dogs 244.

Conversely, if the transverse rows of tortilla disks 133 are being delivered from the steam chamber outlet 31 in positions appreciably forward of the spaces between the intervening transverse rows of dogs 244 so that leading sectorial edges of the tortillas tend to ride up on or jam against the immediately preceding dogs, the rheostatic control of the DC motor 37 will be manipulated to speed up the fryer transport chains 45 so that following rows of tortillas discharged from the steamer will be discharged on the top run of this ropes belting farther back along this top run to be located in between the successive transverse rows of the dogs 244.

It will thus be understood that the location of the projecting dogs 244 upon the endless timing belt 44 provides the top flight 144 of the latter with such dogs to project upward through between the longitudinal ropes of the lateral open web transfer belting 135 for visual indication of the locations of the received tortillas relative to proper spaces thereof to assure successive deliveries of transverse rows of such tortillas to the delivery bridge 55 and therefrom to the feed-in run of the fryer chain transport. The permissible maximum forward positions of the tortilla disks 133 relative to the upwardly extending timing dogs 244 is indicated in FIG. 4.

It will thus be seen that the objects set forth above, among those made apparent from the preceding description, are efficiently attained and, since certain changes may be made in carrying out the above process and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is the novel subjects matter defined in the following claims:

1. Taco shell manufacturing equipment for processing formed and baked disk tortillas and delivering same to suitable packing means for ultimate marketing comprising:
   (a) an elongated chamber,
   (b) first lateral transport means,
   (c) means to equilibrate moisture throughout such baked tortillas in a relatively short tempering time of the general order of about a few seconds to about a few minutes as they are passed in successive longitudinally-spaced groups of transversely disposed disks continuously and successively through said elongated chamber upon said lateral transport means and while being subjected in said chamber to relatively low pressure steam until discharged by said transport means through an exit end opening of said chamber as tempered tortillas,
   (d) apparatus for lap-folding said tortillas,
   (e) apparatus for frying said lap-folded tortillas, said frying apparatus including a hot fat bath,
   (f) means for transferring said tempered tortillas in such longitudinally-spaced transversely disposed groups from the exit end of said chamber to said frying apparatus,
   (g) second lateral transport means for transporting said tortillas in lap-folded form through said hot fat bath in said frying apparatus, and
   (h) means for delivering the fried tortillas as lap-folded taco shells from said frying apparatus to said suitable packing means for ultimate marketing.

2. The taco shell manufacturing equipment as defined in claim 1 characterized by said elongated chamber comprising substantially closed wall structures at the bottom and sides, means providing chamber end walls cooperatively connected at opposite ends of said bottom and sidewalls with said end walls respectively having transverse inlet and outlet openings of limiting outflow dimensions and a vented hood closing off the top of said chamber, and means to supply relatively low pressure steam into said chamber; said first lateral transport means extending laterally from said inlet opening to said outlet opening to carry the longitudinally-spaced transverse groups of tortilla disks into, through and out of said chamber.

3. The taco shell manufacturing equipment as defined in claim 2 characterized by means to supply relatively low pressure steam into said chamber comprising two sets of steam supply piping equipped with pluralities of outlet openings with one set including a plurality of laterally spaced outlet sections located in a lateral plane substantially parallel to and below the path of tortilla travel through said chamber as defined by said first lateral transport means with said outlet sections equipped with a plurality of spaced steam outlets directed upwardly to deliver jets of steam up against the tortilla disks being transported through this chamber by said belting means, and with the other set being of a similarly functioning construction including a plurality of outlet sections located in a lateral plane substantially parallel to and above the path of tortilla travel through said chamber and equipped with a plurality of spaced steam outlets directed downwardly to deliver jets of steam down against the tortilla disks being transported through this chamber.

4. The taco shell manufacturing equipment as defined in claim 3 characterized by the spaced outlet sections of both of said sets respectively extending transversely of the path of tortillas travel through the chamber and spaced appreciably apart along this path.

5. The taco shell manufacturing equipment as defined in claim 4 characterized by each of said sets of transversely-extending outlet sections including a longitudinally-extending supply conduit to which the transverse outlet sections are flow connected and substantially supported thereby.

6. The taco shell manufacturing equipment as defined in claim 5 characterized by the steam outlet openings in said transversely-extending outlet sections being defined by nozzles carried by said outlet sections with each of said nozzles being located along one of a plurality of intended longitudinal paths of travel of the transversely-spaced tortillas carried forward by said transfer means through said chamber.

7. The taco shell manufacturing equipment as defined in claim 1 wherein said lateral transfer means intervening the exit end of said steam tempering chamber and the entrance end of tortillas folding and frying apparatus comprising a lateral run of an open web transfer belting means, means driving said lateral transfer belting run at certain linear speed which assures delivery thereby of the successive transversely disposed groups of steam-tempered flat tortillas to folding means carried by said tortillas-transporting means of said frying apparatus in properly timed relation whereby the flat tortillas in each transversely-aligned group are lap-folded transversely against longitudinally-spaced, transversely-extending, ridge-shaped open web forms and substantially diametrically, said lap-folded tortillas being transported thereby through the hot fat bath for frying them into U-shaped taco shells and then delivering them as such from said frying apparatus.

8. The taco shell manufacturing equipment as defined in claim 7 further comprising driving means for said frying apparatus transporting means, and means for adjusting during operation the relative speeds of the driving means for said lateral transfer means and the driving means for said frying apparatus transporting means whereby the tempered tortillas are delivered to the latter in the properly timed relation.

9. The taco shell manufacturing equipment as defined in claim 8 characterized by provision in such second lateral transport means for successively receiving tortillas from said transfer means for transport successively through the hot fat bath of said fryer, said transfer means being a motor-driven endless belting having a top lateral run extending from the exit end of said elongated chamber, further characterized by a lateral run of endless indicator belting means adjacent said top lateral run of said transfer belting, said indicator belting means carrying longitudinally-spaced visual indicators, means driving said indicator belting means in timed relation to said second lateral transport means whereby visual observation of the advance of said indicators adjacent the advance of the tempered tortillas on said lateral transfer endless belting run when the latter is driven advises a controlling operator as to whether the advancing tortillas will, when received on said second lateral transport means, be properly indexed with respect to said lap folding apparatus, and control means available to said operator to alter at will the relative speed between said transfer means and said second lateral transport means whereby he may make the necessary adjustments to assure proper placement of the tortillas into the entrance end of the fryer.

10. The taco shell manufacturing equipment as defined in claim 9 characterized by said transfer motor-driven endless belting in the form of a plurality of endless, longitudinal and transversely-spaced belting strands and said endless indicator belting means being provided with dogs projecting between the belting strands of the transfer means for ready observation by the operator of the locations of the tortillas being transferred relative to said projecting dogs.

11. The taco shell manufacturing equipment of claim 1 wherein at least a portion of said transfer means is comprised of laterally spaced-apart rope belts.

12. The taco shell manufacturing equipment of claim 1 further comprising means for adjusting the relative positions of the individual tortillas in said longitudinally-spaced groups so as to achieve substantial transverse alignment thereof.

13. The taco shell manufacturing equipment of claim 12 wherein a portion at least of said first lateral transport means or of said transfer means prior to delivery of said tortillas to said frying apparatus is characterized by being made of a material such that said tortillas being transported thereon can be moved longitudinally relative thereto without being substantially deformed.

14. The taco shell manufacturing equipment of claim 12 wherein the means for adjusting the positions of said tortillas in said groups relative to one another includes a section of said transfer means comprised of a plurality of longitudinally-extending, transversely-spaced endless ropes moving longitudinally at a first speed and upstanding dogs projecting upwardly between said ropes and moving longitudinally at a second speed different from said first speed.

15. The taco shell manufacturing equipment of claim 14 wherein said first speed is greater than said second speed.

16. The taco shell manufacturing equipment of claim 14 wherein said ropes are tubular.

17. The taco shell manufacturing equipment of claim 14 wherein said ropes are plastic or rubber.

18. The taco shell manufacturing equipment of claim 14 further characterized in that said tortillas are delivered to said frying apparatus at substantially said second speed.

19. The taco shell manufacturing equipment of claim 12 wherein the means for adjusting the positions of said tortillas in said groups relative to one another is comprised of means for transporting said tortillas at a first longitudinal speed and means for slowing down said movement of said tortillas to a second, slower speed by reducing the speed of the most longitudinally advanced tortilla in the group relative to the remaining ones and sequentially reducing the speed of each tortilla in the group as it becomes laterally aligned with the first tortilla to have been slowed until all tortillas in the group have been aligned.

20. The taco shell manufacturing equipment of claim 19 wherein at least a portion of said transfer means is comprised of longitudinally extending, transversely spaced endless belts.

21. The taco shell manufacturing equipment of claim 20 wherein said ropes are plastic or rubber.

22. The taco shell manufacturing equipment of claim 19 further characterized in that said tortillas are delivered to said frying apparatus at substantially said second speed.

23. Taco shell manufacturing equipment for processing formed tortillas and delivering same to suitable packing means for ultimate marketing comprising:
  (a) oven means for baking said tortillas,
  (b) first lateral transfer means for receiving baked tortillas from said oven means,
  (c) a chamber for receiving baked tortillas from said first lateral transfer means,
  (d) means to equilibrate moisture throughout such baked tortillas in a relatively short tempering time of the order of about a few seconds to a few minutes as they are passed in successive longitudinally-spaced groups transversely disposed through said chamber,
  (e) second lateral transfer means for receiving said tortillas from said chamber,
  (f) alignment means for transversely aligning the tortillas in each of said groups,
  (g) apparatus for frying said tortillas,
  (h) third lateral transfer means for moving said moisture-equilibrated tortillas through said frying means,
  (i) means for delivering said fried tortillas from said frying apparatus to said packing means, and
  (j) adjustable timing means for permitting adjustment of the spacing between said groups of tortillas as they are delivered to said frying means.

* * * * *